US011993258B2

(12) United States Patent
Hashimoto et al.

(10) Patent No.: US 11,993,258 B2
(45) Date of Patent: May 28, 2024

(54) VEHICLE CONTROL APPARATUS

(71) Applicant: TOYOTA JIDOSHA KABUSHIKI KAISHA, Toyota (JP)

(72) Inventors: Sho Hashimoto, Shizuoka-ken (JP); Nobuaki Fukuchi, Numazu (JP); Yumi Shimanaka, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 261 days.

(21) Appl. No.: 17/577,581

(22) Filed: Jan. 18, 2022

(65) Prior Publication Data

US 2022/0227361 A1 Jul. 21, 2022

(30) Foreign Application Priority Data

Jan. 20, 2021 (JP) .................................. 2021-006966

(51) Int. Cl.
*B60W 30/09* (2012.01)
*B60W 10/184* (2012.01)
*B60W 10/20* (2006.01)

(52) U.S. Cl.
CPC .......... *B60W 30/09* (2013.01); *B60W 10/184* (2013.01); *B60W 10/20* (2013.01);
(Continued)

(58) Field of Classification Search
CPC .... B60W 30/09; B60W 10/184; B60W 10/20; B60W 2554/80; B60W 2540/103; B60W 2540/18; B60W 2710/18; B60W 2710/202

See application file for complete search history.

(56) References Cited

U.S. PATENT DOCUMENTS 4,852,950 A * 8/1989 Murakami .......... B60T 8/17616
  303/146
9,896,095 B2 * 2/2018 Katoh ............... B60W 30/0956
(Continued)

FOREIGN PATENT DOCUMENTS

EP   3 235 698 A1   10/2017
JP   H05272370 A  * 10/1993
(Continued)

*Primary Examiner* — Anshul Sood
*Assistant Examiner* — Oliver Tan
(74) *Attorney, Agent, or Firm* — Sughrue Mion, PLLC

(57) ABSTRACT

A vehicle control apparatus executes a collision avoiding control of avoiding collision of an own vehicle with an object when a predetermined execution condition becomes satisfied. The collision avoiding control includes a steering control of changing a steering angle of the own vehicle and a braking force control of applying braking force to the own vehicle so as to realize a target deceleration. The vehicle control apparatus terminates the steering control and decreases the target deceleration at a first rate to terminate the braking force control when a predetermined steering termination condition that the collision has been avoided, becomes satisfied. The vehicle control apparatus terminates the steering control and decreases the target deceleration at a second rate to terminate the braking force control when a predetermined cancelation condition that a driver carries out a driving maneuver, becomes satisfied. The second rate is greater than the first rate.

5 Claims, 11 Drawing Sheets

(52) U.S. Cl.
CPC ... *B60W 2540/103* (2013.01); *B60W 2540/18* (2013.01); *B60W 2554/80* (2020.02); *B60W 2710/18* (2013.01); *B60W 2710/202* (2013.01)

(56) References Cited

U.S. PATENT DOCUMENTS

| | | | |
|---|---|---|---|
| 10,683,007 B2* | 6/2020 | Saiki | G08G 1/165 |
| 10,807,594 B2* | 10/2020 | Hatano | B60W 10/18 |
| 2010/0023226 A1* | 1/2010 | Ito | B60R 21/0134 |
| | | | 701/46 |
| 2015/0210255 A1* | 7/2015 | Fletcher | B60T 8/17 |
| | | | 701/70 |
| 2016/0311416 A1* | 10/2016 | Bretzigheimer | B60T 8/246 |
| 2017/0057498 A1 | 3/2017 | Katoh | |
| 2018/0178782 A1 | 6/2018 | Saiki et al. | |
| 2019/0100197 A1 | 4/2019 | Saiki | |
| 2021/0107471 A1* | 4/2021 | Saiki | B60W 10/18 |

FOREIGN PATENT DOCUMENTS

| | | |
|---|---|---|
| JP | 2017-043262 A | 3/2017 |
| JP | 2018-103645 A | 7/2018 |

\* cited by examiner

VEHICLE CONTROL APPARATUS

BACKGROUND

Field

The invention relates to a vehicle control apparatus which is configured to execute a collision avoiding control.

Description of the Related Art

There is known a vehicle control apparatus which is configured to execute a collision avoiding control of avoiding collision of a vehicle with an obstacle (for example, see JP 2017-043262 A). For example, the collision avoiding control includes a steering control of changing steering angles of steered wheels of the vehicle and a braking force control of applying braking force to wheels of the vehicle.

When the vehicle control apparatus determines that the vehicle is going to collide with the obstacle, the vehicle control apparatus executes the steering control and the braking force control. Thereby, the vehicle is decelerated and passes by the obstacle.

For example, when the vehicle control apparatus terminates execution of the steering control and the braking force control simultaneously at a point of time when the collision of the vehicle with the obstacle has been avoided, deceleration of the vehicle is stopped at once. Thus, a driver of the vehicle may have a feel of strangeness.

For another example, when the driver carries out a driving maneuver, for example, of operating an accelerator pedal while the steering control and the braking force control are being executed, acceleration of the vehicle is restricted due to the braking force control being executed. Thus, the driving maneuver carried out by the driver is not reflected on the vehicle. Thus, the driver may have a feeling of strangeness.

SUMMARY

An object of the invention is to provide a vehicle control apparatus which changes processes to terminate the execution of the braking force control, depending on situations to prevent the driver from having a feeling of strangeness.

A vehicle control apparatus according to the invention comprises at least one sensor and an electronic control unit. The at least one sensor is configured to acquire object information on objects in a surrounding area around an own vehicle. The electronic control unit is configured to execute a collision avoiding control of avoiding collision of the own vehicle with the object when the electronic control unit determines, based on the object information, that a predetermined execution condition that the own vehicle is going to collide with the object, becomes satisfied. The collision avoiding control includes (i) a steering control of changing a steering angle of the own vehicle to move the own vehicle along a target route set to avoid collision of the own vehicle with the object and (ii) a braking force control of applying braking force to the own vehicle so as to realize a target deceleration.

The electronic control unit is configured to terminate executing the steering control and decrease the target deceleration at a first rate to terminate execution of the braking force control when a predetermined steering termination condition that the collision of the own vehicle with the object has been avoided by the steering control, becomes satisfied. In addition, the electronic control unit is configured to terminate executing the steering control and decrease the target deceleration at a second rate to terminate the execution of the braking force control when a predetermined cancelation condition that a driver of the own vehicle carries out a driving maneuver, becomes satisfied. Further, the second rate is greater than the first rate.

The vehicle control apparatus configured as described above can change the processes to terminate the execution of the braking force control, depending on the situations. In particular, when the predetermined steering termination condition becomes satisfied, the vehicle control apparatus decreases the target deceleration at the first rate to terminate the execution of the braking force control. Thereby, when the predetermined steering termination condition becomes satisfied, the target deceleration does not shortly become zero but gradually decreases. Thus, the driver is unlikely to have a feeling of strangeness.

On the other hand, when the predetermined cancelation condition becomes satisfied, the vehicle control apparatus decreases the target deceleration at the second rate to terminate the execution of the braking force control. The second rate is greater than the first rate. Thus, when the driver carries out the driving maneuver, the target deceleration is decreased at the greater rate, compared with when the predetermined steering termination condition becomes satisfied. In this case, the driving maneuver carried out by the driver is reflected on the own vehicle. Thus, the driver is unlikely to have a feeling of strangeness.

According to an aspect of the invention, the electronic control unit is configured to decrease the target deceleration at the second rate to terminate the execution of the braking force control when the predetermined cancelation condition becomes satisfied after the predetermined steering termination condition becomes satisfied.

With this aspect of the invention, when the driver carries out the driving maneuver after execution of the steering control is terminated, the execution of the braking force control is terminated shortly. In this case, the driving maneuver carried out by the driver is reflected on the vehicle. Thus, the driver is unlikely to have a feeling of strangeness.

According to another aspect of the invention, the electronic control unit is configured to determine that the predetermined steering termination condition becomes satisfied when (i) the own vehicle has passed by the object, and (ii) the steering angle continues to be smaller than or equal to a predetermined steering angle value for a predetermined duration time threshold or more.

According to further another aspect of the invention, the electronic control unit is configured to determine that the predetermined cancelation condition becomes satisfied when (i) a first condition that an operation amount of an accelerator pedal of the own vehicle is greater than or equal to a predetermined operation amount threshold, becomes satisfied, or (ii) a second condition that steering torque applied to a steering shaft of the own vehicle by maneuvering a steering wheel of the own vehicle by the driver is greater than or equal to a predetermined torque threshold, becomes satisfied.

According to one or more embodiments, the electronic control unit may be realized by a micro-processor which is programmed to execute one or more functions described in the specification. Further, according to one or more embodiments, the electronic control unit may be entirely or partially realized by hardware which is configured by one or more integrated circuits such as ASIC dedicated to one or more applications.

Elements of the invention are not limited to elements of embodiments and modified examples of the invention described with reference to the drawings. The other objects, features and accompanied advantages of the invention can be easily understood from the embodiments and the modified examples of the invention.

DESCRIPTION OF THE EMBODIMENTS

<Configuration of Vehicle Control Apparatus>

Figure 1:
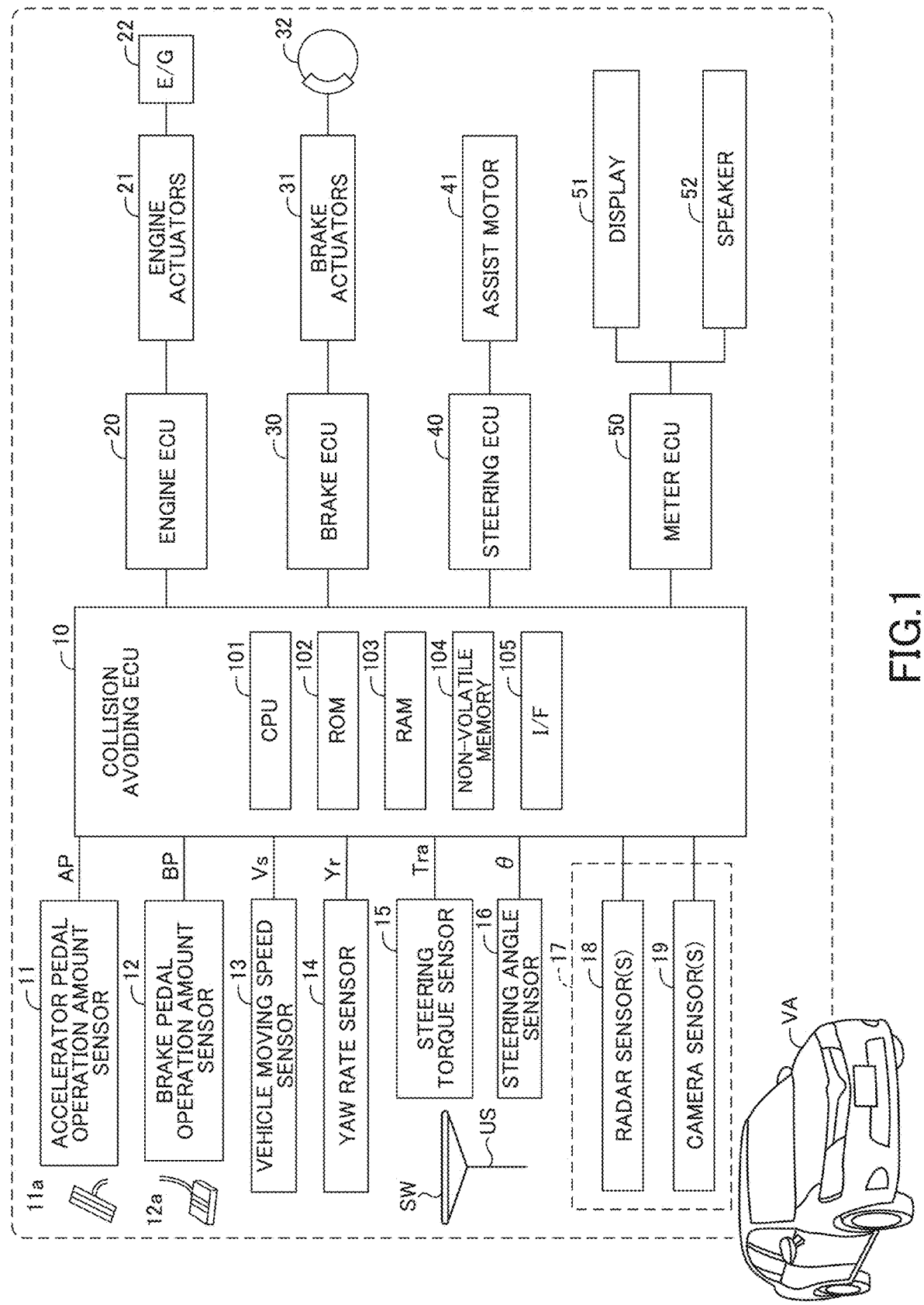
FIG. 1 is a general configuration view which shows a vehicle control apparatus according to one or more embodiments of the invention.

As shown in FIG. 1, a vehicle control apparatus according to one or more embodiments of the invention is applied to an own vehicle VA. The vehicle control apparatus includes a collision avoiding ECU 10, an engine ECU 20, a brake ECU 30, a steering ECU 40, and a meter ECU 50. Some or all of the ECUs 10, 20, 30, 40, and 50 may be integrated into one ECU.

Each of the ECUs 10 to 50 is an electronic control unit which includes a micro-computer as a main component. The ECUs 10 to 50 are electrically connected so as to send and receive information to and from each other via a CAN (Controller Area Network) not shown.

In this specification, the micro-computer includes a CPU, a ROM, a RAM, a non-volatile memory, and an interface I/F. For example, the collision avoiding ECU 10 includes the micro-computer which includes the CPU 101, the ROM 102, the RAM 103, the non-volatile memory 104, and the interface (I/F) 105. The CPU 101 is configured or programmed to realize various functions by executing instructions or programs or routines stored in the ROM 102.

The collision avoiding ECU 10 is electrically connected to sensors described below. The collision avoiding ECU 10 is configured or programmed to receive detection signals or output signals from the sensors. Some or all of the sensors may be electrically connected to any of the ECUs other than the collision avoiding ECU 10. In this case, the collision avoiding ECU 10 receives the detection signals or the output signals of the sensors via the CAN from the ECUs which are electrically connected to the sensors.

An accelerator pedal operation amount sensor 11 detects operation amounts AP of an accelerator pedal 11a and outputs signals which represent the accelerator pedal operation amounts AP. A brake pedal operation amount sensor 12 detects operation amounts BP of a brake pedal 12a and outputs signals which represent the brake pedal operation amounts BP.

A vehicle moving speed sensor 13 detects moving speeds Vs of the own vehicle VA (vehicle moving speeds Vs) and outputs signals which represent the moving speeds Vs. A yaw rate sensor 14 detects yaw rates Yr of the own vehicle VA and outputs signals which represent the yaw rates Yr.

A steering torque sensor 15 detects steering torques Tra which are applied to a steering shaft US by steering maneuver applied to a steering wheel SW by a driver of the own vehicle VA and outputs signals which represent the steering torques Tra. The steering torque Tra takes a positive value when the steering wheel SW is rotated in a first direction or a counterclockwise direction. On the other hand, the steering torque Tra takes a negative value when the steering wheel SW is rotated in a second direction or a clockwise direction.

A steering angle sensor 16 detects steering angles θ of the own vehicle VA and outputs signals which represent the steering angles θ. The steering angle θ takes a positive value when the steering wheel SW is rotated from a predetermined reference position or a neutral position in the first direction or the counterclockwise direction. On the other hand, the steering angle θ takes a negative value when the steering wheel SW is rotated from the predetermined reference position or the neutral position in the second direction or the clockwise direction. When the steering wheel SW is positioned at the predetermined reference position, the steering angle θ is zero, and the own vehicle VA moves straight.

Hereinafter, "information on moving states of the own vehicle VA" output from the sensors 11 to 16 will be also referred to as "moving state information".

Surrounding sensors 17 acquire information on a road around the own vehicle VA. The road around the own vehicle VA includes a moving lane on which the own vehicle VA moves. In addition, the surrounding sensors 17 acquire information on standing objects on the road. The standing objects are, for example, (i) moving objects such as four-wheeled vehicles and bicycles, and (ii) non-moving objects such as guard rails and fences. Hereinafter, the standing objects will be referred to as "objects".

Figure 2:
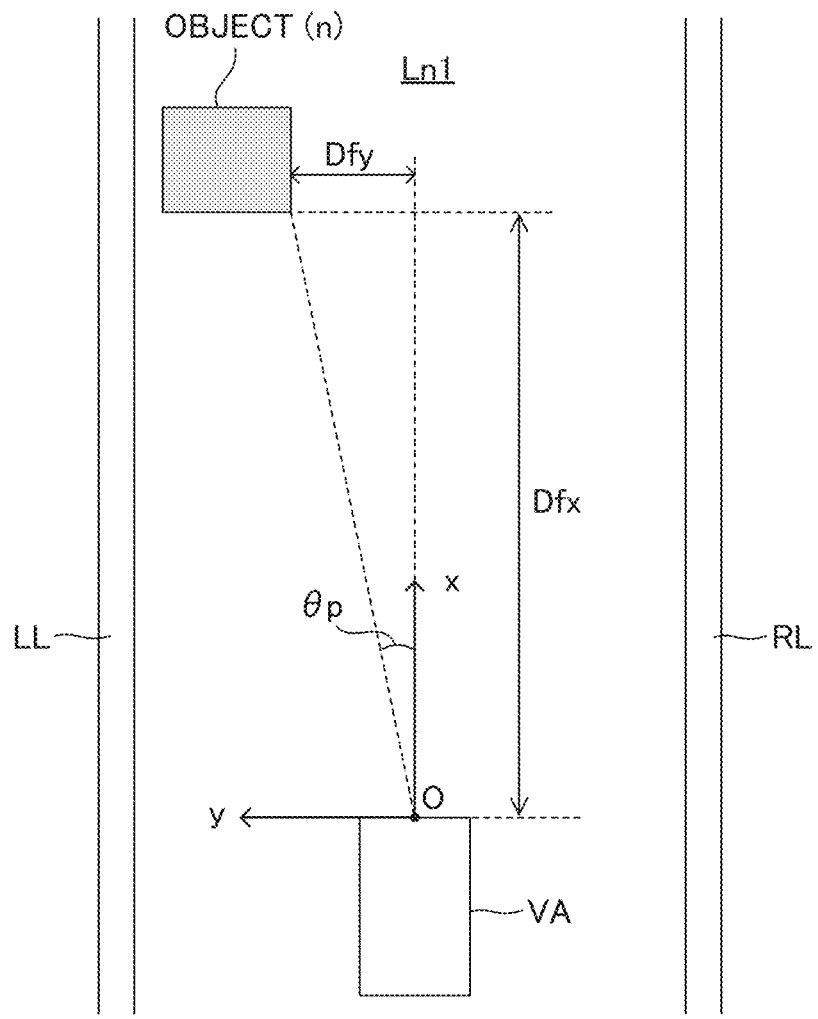
FIG. 2 is a view which describes object information acquired by surrounding sensors.

As shown in FIG. 2, the surrounding sensors acquire the object information on a two-dimension coordinate system. The two-dimension coordinate system is defined by an x-axis and a y-axis. An origin of the x-axis and the y-axis corresponds to a center position O of a front portion of the own vehicle VA in a width direction of the own vehicle VA. The x-axis extends through the center position O of the own vehicle VA in a longitudinal direction of the own vehicle VA. Values on the x-axis to the forward side of the center position O of the own vehicle VA are positive. The y-axis is perpendicular to the x-axis. Values on the y-axis to the left side of the center position O of the own vehicle VA are positive.

The object information includes longitudinal distances Dfx(n) of the objects (n), lateral positions Dfy(n) of the objects (n), orientations θp of the objects (n) with respect to the own vehicle VA, moving directions of the objects (n), relative speeds Vfx(n) of the objects (n), and types of the objects (n).

The longitudinal distance Dfx(n) is a distance between the object (n) and the origin O in an x-axis direction. The longitudinal distance Dfx(n) takes a positive or negative value. The lateral distance Dfy(n) is a distance between the object (n) and the origin O in a y-axis direction. The lateral distance Dfy(n) also takes a positive or negative value. The relative speed Vfx(n) is a difference between a moving speed Vn of the object (n) and the moving speed Vs of the own vehicle VA (Vfx(n)=Vn−Vs). The moving speed Vn of the object (n) is a moving speed of the object (n) in the x-axis direction. The type of the object (n) is information which the object (n) is, the moving object or the non-moving object.

Again, referring to FIG. 1, the surrounding sensors 17 include at least one radar sensor 18 and at least one camera sensor 19.

For example, the radar sensor 18 transmits radio waves of a millimeter wave band (hereinafter, the radio waves of the millimeter wave band will be referred to as "millimeter waves") at least to a surrounding area around the own vehicle VA. The surrounding area around the own vehicle VA includes a forward area ahead of the own vehicle VA. In addition, the radar sensor 18 receives reflected waves, i.e., the millimeter waves reflected by the objects in a millimeter-wave-transmitting area. Then, the radar sensor 18 detects the objects (n), based on reflected-wave information such as (i) phase differences between the respective transmitted millimeter waves and the respective received reflected waves, (ii) attenuated levels of the reflected waves, and (iii) time taken to receive the respective reflected waves from transmitting the respective millimeter waves. In addition, the radar sensor 18 acquires or calculates the object information on the objects (n), based on the reflected-wave information.

The camera sensor 19 takes images of view ahead of the own vehicle VA and acquires image data. The camera sensor 19 recognizes a left lane marking LL and a right lane marking RL, based on the image data. The left lane marking LL and the right lane marking RL define the moving lane. Then, as shown in FIG. 2, the camera sensor 19 acquires position information on the left lane marking LL and position information on the right lane marking RL on the two-dimension coordinate system. The information acquired by the camera sensor 19 will be referred to as "lane information". The camera sensor 19 may be configured to determine whether there are the objects and calculate the object information, based on the image data.

The surrounding sensors 17 output information on surrounding situation around the own vehicle VA to the collision avoiding ECU 10 as vehicle surrounding information. The vehicle surrounding information includes the object information and the lane information.

As shown in FIG. 2, the collision avoiding ECU 10 recognizes (i) a shape of the moving lane Ln1 defined by the left lane marking LL and the right lane marking RL, (ii) positions of the own vehicle VA and the respective object (n) in the moving lane Ln1, and (iii) orientation of the own vehicle VA with respect to the moving lane Ln1, using the vehicle surrounding information.

Again, referring to FIG. 1, the engine ECU 20 is electrically connected to engine actuators 21. The engine actuators 21 include a throttle valve actuator which changes an opening degree of a throttle valve of a spark-ignition gasoline-fuel-injection type of an internal combustion engine 22. The engine ECU 20 can change torque which the internal combustion engine 22 generates by driving the engine actuators 21. The torque generated by the internal combustion engine 22 is transmitted to driven wheels (not shown) of the own vehicle VA via a transmission (not shown). Thus, the engine ECU 20 can change an accelerated state or an acceleration of the own vehicle VA by controlling the engine actuators 21 to control driving force.

When the own vehicle VA is a hybrid vehicle, the engine ECU 20 can control the driving force generated by one or both of the internal combustion engine and at least one electric motor as vehicle driving sources. Further, when the own vehicle VA is an electric vehicle, the engine ECU 20 can control the driving force generated by at least one electric motor as the vehicle driving source.

The brake ECU 30 is electrically connected to brake actuators 31. The brake actuators 31 include hydraulic circuits. The hydraulic circuits include (i) a master cylinder, (ii) hydraulic passages through which braking liquid flows, (iii) valves, (iv) at least one pump, and (v) at least one electric motor which drives the at least one pump. The brake ECU 30 adjusts hydraulic pressure applied to wheel cylinders installed in brake mechanisms 32 by controlling the brake actuators 31. The wheel cylinders generate friction braking force to be applied to wheels of the own vehicle VA by the hydraulic pressure. Thus, the brake ECU 30 can change the accelerated state of the own vehicle VA, i.e., deceleration of the own vehicle VA, i.e., the negative acceleration of the own vehicle VA by controlling the brake actuators 31 to control the braking force.

The steering ECU 40 is a control unit of a known electric power steering system. The steering ECU 40 is electrically connected to an assist motor 41. The assist motor 41 is installed in a steering mechanism of the own vehicle VA. The steering mechanism of the own vehicle VA includes the steering wheel SW, the steering shaft US, and a steering gear mechanism. The assist motor 41 can generate torque to apply steering assist torque and turn left and right steered wheels of the own vehicle VA.

The meter ECU 50 is electrically connected to a display 51 and a speaker 52. The display 51 is a multi-information display provided in front of a driver's seat of the own vehicle VA. When the speaker 52 receives an announcement command from the collision avoiding ECU 10, the speaker 52 generates announcement, depending on the received announcement command.

<Collision Avoiding Control>

Hereinafter, the collision avoiding ECU 10 will be simply referred to as "ECU 10". The ECU 10 is configured or programmed to execute a collision avoiding control. The collision avoiding control is a control for avoiding collision of the own vehicle VA with an obstacle in the forward area ahead of the own vehicle VA. The collision avoiding control is known (for example, see JP 2017-043262 A and JP 2018-103645 A). Below, a flow of processes of the collision avoiding control will be described.

The ECU 10 detects the objects (n) in the surrounding area around the own vehicle VA, based on the object information included in the vehicle surrounding information.

Further, the ECU 10 calculates a first predicted path, based on the moving state information such as the moving speed Vs, the yaw rate Yr, and the steering angle θ. The first predicted path is a path predicted for the own vehicle VA to move.

Further, the ECU 10 determines which each object (n) is, the moving object or the non-moving object, based on the object information. When the object (n) is the moving object, the ECU 10 calculates a second predicted path, based on the object information such as the moving direction of the object (n) in question. The second predicted path is a path predicted for the object (n) in question to move.

When the object (n) is the non-moving object, the ECU 10 determines whether the own vehicle VA is going to collide with the object (n) in question, based on the first predicted path and the position of the object (n) in question. When the first predicted path passes through the position of the object (n) in question, the ECU 10 determines that the own vehicle VA is going to collide with the object (n) in question.

On the other hand, when the object (n) is the moving object, the ECU 10 determines whether the own vehicle VA is going to collide with the object (n) in question, based on the first predicted path and the second predicted path of the object (n) in question. When the first predicted path and the second predicted path cross each other, the ECU 10 determines that the own vehicle VA is going to collide with the object (n) in question.

When the ECU 10 determines that the own vehicle VA is going to collide with the object (n), the ECU 10 determines or sets the object (n) as the obstacle.

Next, the ECU 10 determines whether a predetermined execution condition is satisfied. The predetermined execution condition is a condition used to determine whether to execute the collision avoiding control or start executing the collision avoiding control. In particular, the ECU 10 calculates collision predicted time TTC (Time To Collision), based on (i) the longitudinal distance Dfx(n) between the own vehicle VA and the obstacle and (ii) the relative speed Vfx(n) between the own vehicle VA and the obstacle. The collision predicted time TTC is time presumably taken for the own vehicle VA to collide with the obstacle. The collision predicted time TTC can be calculated by dividing the longitudinal distance Dfx(n) by the relative speed Vfx(n).

The predetermined execution condition is satisfied when the collision predicted time TTC is shorter than or equal to a predetermined time threshold Tath. When the collision predicted time TTC is shorter than or equal to the predetermined time threshold Tath, it means that the own vehicle VA is going to collide with the obstacle. Thus, the ECU 10 executes the collision avoiding control for the obstacle.

In this embodiment, the collision avoiding control at least includes a braking force control and a steering control. The steering control is a control of changing steering angles of the steered wheels of the own vehicle VA to move the own vehicle VA along a target route TP or an avoiding route set to avoid the collision of the own vehicle VA with the obstacle. The braking force control is a control of applying the braking force to the own vehicle VA, in particular, the wheels of the own vehicle VA, to realize a target deceleration TG. Below, the braking force control and the steering control will be described.

<Steering Control>

Figure 3:
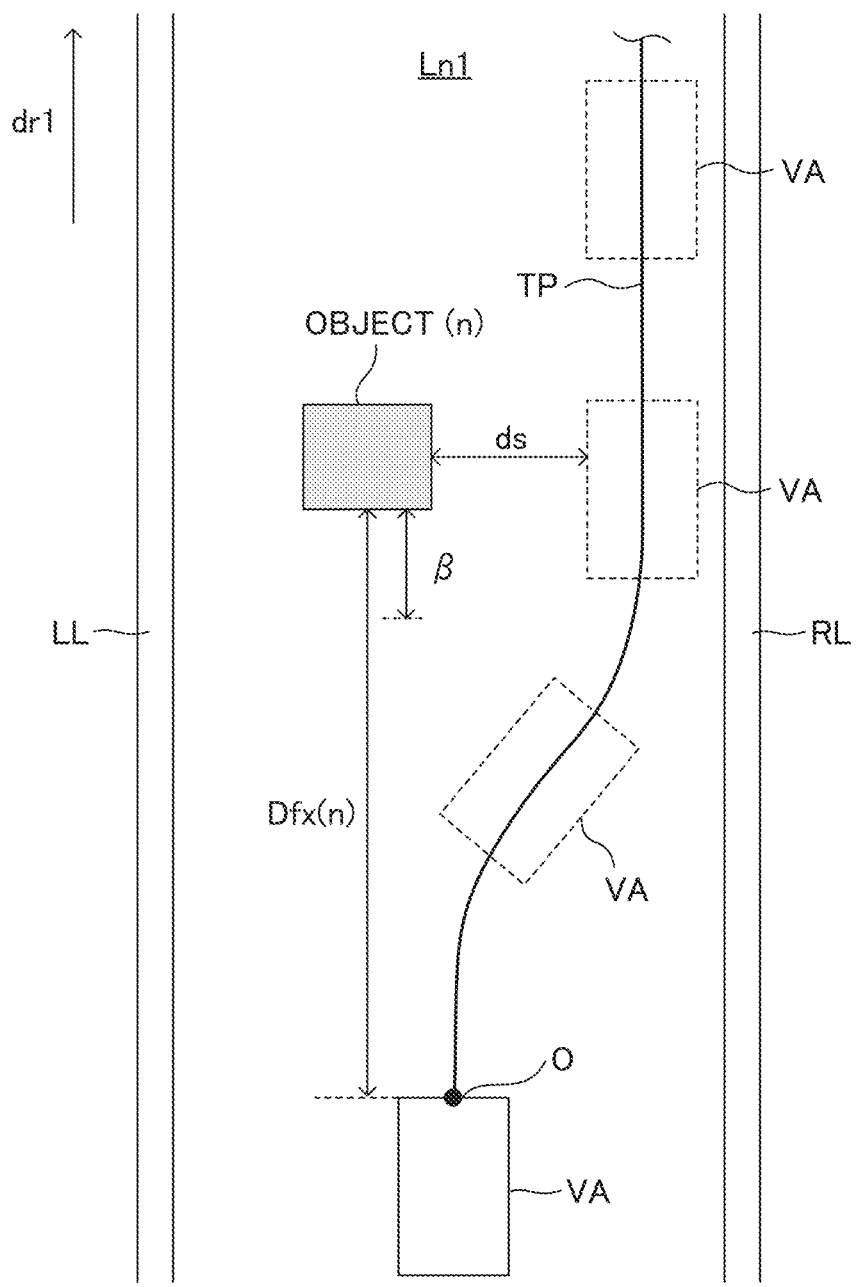
FIG. 3 is a plan view which describes a target route or an avoiding route.

As shown in FIG. 3, the ECU 10 calculates the target route TP. The target route TP is a route along which the center position O of the own vehicle VA (i.e., the center position of the front portion of the own vehicle VA in the width direction of the own vehicle VA) moves. The target route TP is set such that (i) a distance ds in a road-width direction between the own vehicle VA and the object (n) is maintained longer than or equal to a predetermined distance threshold dth, and (ii) the own vehicle VA is prevented from departing from the moving lane Ln1. In addition, the target route TP is set such that the moving direction of the own vehicle VA finally corresponds to a direction dr1 in which the moving lane Ln1 extends. Thereby, the moving direction of the own vehicle VA finally becomes parallel to the left lane marking LL and the right lane marking RL. Thus, when the driver of the own vehicle VA does not maneuver the steering wheel SW, the own vehicle VA is prevented from departing from the moving lane Ln1.

Then, the ECU 10 calculates a target steering torque Atr, based on the target route TP. The target steering torque Atr corresponds to a control amount to move the own vehicle VA along the target route TP. The target steering torque Atr will be also referred to as "steering control amount". Then, the ECU 10 sends steering command signals to the steering ECU 40. The steering command signal includes the target steering torque Atr. When the steering ECU 40 receives the steering command signal from the ECU 10, the steering ECU 40 drives the assist motor 41, based on the target steering torque Atr.

After the ECU 10 starts executing the steering control, the ECU 10 determines whether a predetermined steering termination condition is satisfied. The predetermined steering termination condition becomes satisfied when the collision of the own vehicle VA with the obstacle (the object (n)) has been avoided by the steering control.

In particular, the predetermined steering termination condition becomes satisfied when (i) the own vehicle VA has passed by the object (n), and (ii) a magnitude or an absolute value of the steering angle θ of the own vehicle VA continues to be smaller than or equal to a predetermined steering angle value θn (for example, a value near zero) for a predetermined duration time threshold Tdth or more. It means that the own vehicle VA has passed by the object (n), and the moving direction of the own vehicle VA becomes parallel to the left lane marking LL and the right lane marking RL. Thus, the own vehicle VA does not collide with the object (n), and the own vehicle VA does not depart from the moving lane Ln1. When the predetermined steering termination condition becomes satisfied, the ECU 10 terminates executing the steering control. In addition, as described later, after the ECU 10 terminates executing the steering control, the ECU 10 terminates executing the braking force control. As such, the ECU 10 terminates executing the steering control and the braking force control at different timings.

In addition, after the ECU 10 starts executing the collision avoiding control, the ECU 10 determines whether a predetermined cancelation condition is satisfied. The predetermined cancelation condition is a condition for stopping or cancelling the execution of the collision avoiding control. The predetermined cancelation condition becomes satisfied when the driver of the own vehicle VA carries out a predetermined driving maneuver.

In particular, the predetermined cancelation condition becomes satisfied when at least one of conditions A1 and A2 becomes satisfied.

Condition A1: The accelerator pedal operation amount AP is greater than or equal to a predetermined operation amount threshold APth.

Condition A2: A magnitude or an absolute value of the steering torque Tra is greater than or equal to a predetermined torque threshold Trth.

A situation that the predetermined cancelation condition becomes satisfied, is any of a situation (a) and a situation (b) described below.

Situation (a): The predetermined cancelation condition becomes satisfied before the predetermined steering termination condition becomes satisfied. It means that the driver carries out the driving maneuver, i.e., an operation of operating the accelerator pedal 11*a* and/or an operation of operating the steering wheel SW for avoiding the collision of the own vehicle VA with the object (n) before the own vehicle VA has passed by the object (n).

Situation (b): The predetermined cancelation condition becomes satisfied after the predetermined steering termination condition becomes satisfied. It means that the driver starts the driving maneuver, i.e., the operation of operating the accelerator pedal 11a and/or the operation of operating the steering wheel SW after the own vehicle VA has passed by the object (n).

In the situation (a), the ECU 10 terminates executing the steering control and then, terminates executing the braking force control.

In the situation (b), execution of the steering control has been already terminated. Thus, the ECU 10 terminates executing the braking force control.

<Braking Force Control>

The ECU 10 sets the target deceleration TG. Then, the ECU 10 sends braking command signals to the brake ECU 30. The braking command signal includes information on the target deceleration TG. When the brake ECU 30 receives the braking command signal from the ECU 10, the brake ECU 30 controls the brake actuators to apply the braking force to the wheels of the own vehicle VA so as to control the actual acceleration of the own vehicle VA to the target deceleration TG.

In this embodiment, the braking force control includes a first decelerating control, a second decelerating control, and a third decelerating control. The ECU 10 executes any of the first decelerating control, the second decelerating control, and the third decelerating control in accordance with a state transition of a control state shown in FIG. 4.

Figure 4:
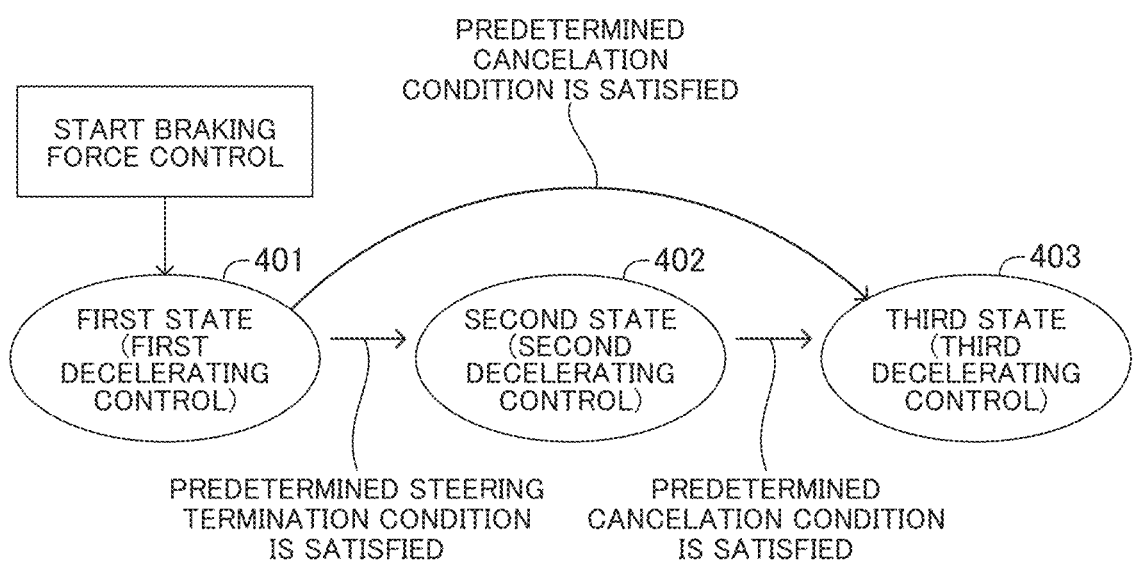
FIG. 4 is a view which shows change of a control state.

As shown in FIG. 4, the control state includes a first state 401, a second state 402, and a third state 403. After the ECU 10 starts executing the braking force control, the ECU 10 repeatedly determines which the control state is, the first state 401, the second state 402, or the third state 403.

As shown in FIG. 4, when the predetermined execution condition becomes satisfied, that is, when the ECU 10 starts executing the braking force control, the ECU 10 determines that the control state is the first state 401. The first state 401 is a state that the predetermined steering termination condition and the predetermined cancelation condition are not satisfied. When the control state is the first state 401, the ECU 10 executes the first decelerating control. The first decelerating control is a control of setting the target deceleration TG to a deceleration da1 and decelerating the own vehicle VA. The deceleration da1 is a negative acceleration.

When the predetermined steering termination condition becomes satisfied while the control state is the first state 401, the ECU 10 changes the control state from the first state 401 to the second state 402. In the second state 402, the collision of the own vehicle VA with the obstacle has been avoided, and the driver has not started the driving maneuver, i.e., the operation of operating the accelerator pedal 11a and the operation of operating the steering wheel SW yet. If deceleration of the own vehicle VA is shortly terminated in the second state 402, the driver may have a feeling of strangeness. Thus, when the control state is the second state 402, the ECU 10 executes the second decelerating control. The second decelerating control is a control of decelerating the own vehicle VA with decreasing the magnitude or the absolute value of the target deceleration TG at a first rate. In particular, a change amount of the magnitude of the target deceleration TG per unit time dT in the second decelerating control is a first change amount $\Delta G1$ (>0). Thereby, the magnitude of the target deceleration TG is gradually decreased. Thus, the driver is unlikely to have a feeling of strangeness. In addition, the driver can be provided with enough time to start the driving maneuver.

When the predetermined cancelation condition becomes satisfied while the control state is the first state 401 or the second state 402, the ECU 10 changes the control state to the third state 403. In the third state 403, the driver is carrying out the driving maneuver, i.e., the operation of operating the accelerator pedal 11a and/or the operation of operating the steering wheel SW. Thus, if acceleration of the own vehicle VA is restricted due to the braking force control, the driver may have a feeling of strangeness. Thus, when the control state is the third state 403, the ECU 10 executes the third decelerating control. The third decelerating control is a control of decelerating the own vehicle VA with decreasing the magnitude or the absolute value of the target deceleration TG at a second rate. The second rate is greater than the first rate. In particular, the change amount of the magnitude of the target deceleration TG per unit time dT in the third decelerating control is a second change amount $\Delta G2$ (>0). The second change amount $\Delta G2$ is greater than the first change amount $\Delta G1$.

After the ECU 10 starts executing the braking force control, the ECU 10 determines whether a predetermined braking termination condition is satisfied. The predetermined braking termination condition becomes satisfied when one of conditions B1 and B2 described below becomes satisfied. When the predetermined braking termination condition becomes satisfied, the ECU 10 terminates executing the braking force control.

Condition B1: The target deceleration TG is zero.
Condition B2: The moving speed Vs of the own vehicle VA is zero.

Operation Example 1

Figure 5:
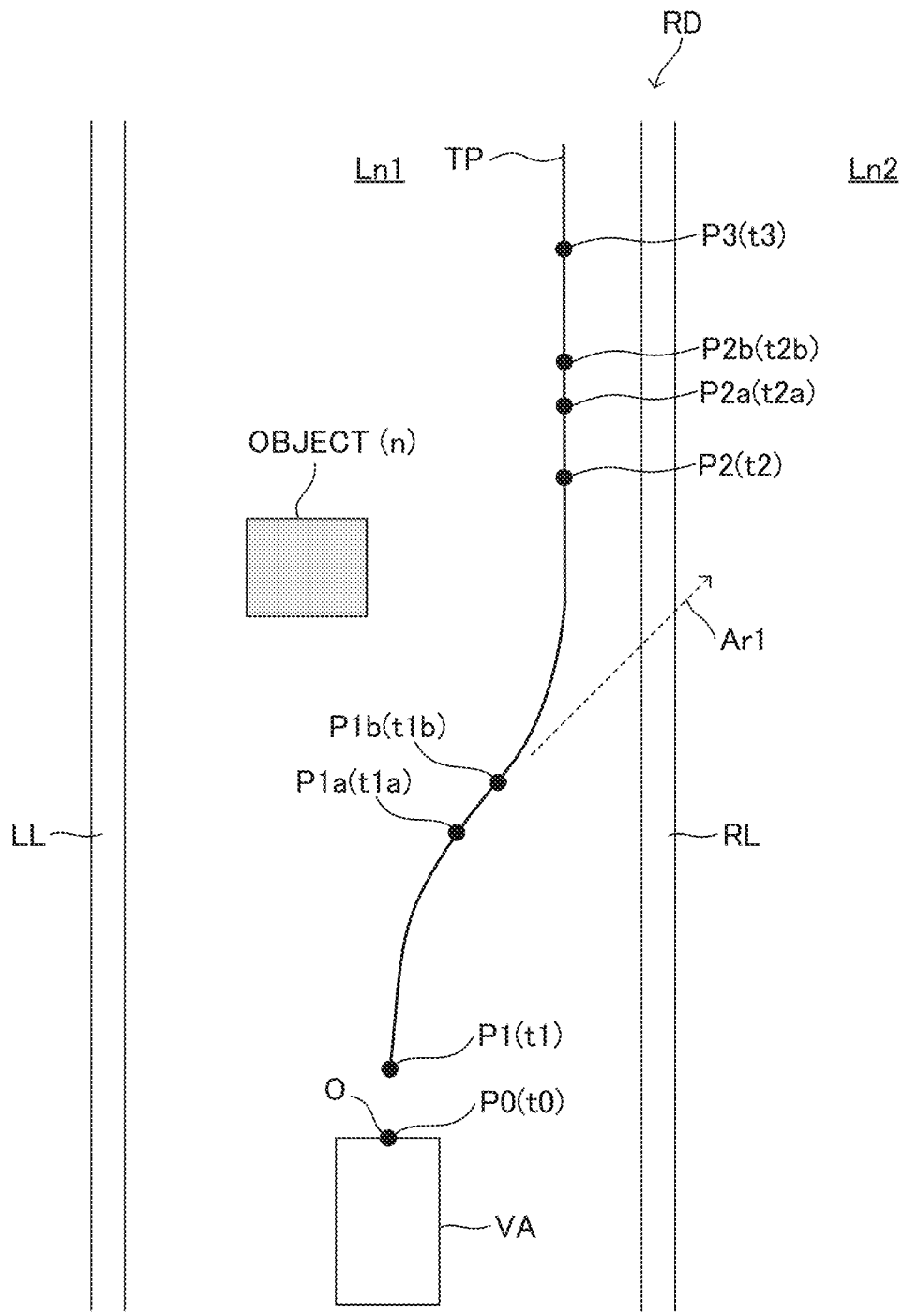
FIG. 5 is a view which shows a situation that an own vehicle moves on a road on which there is an object (n).
Figure 6:
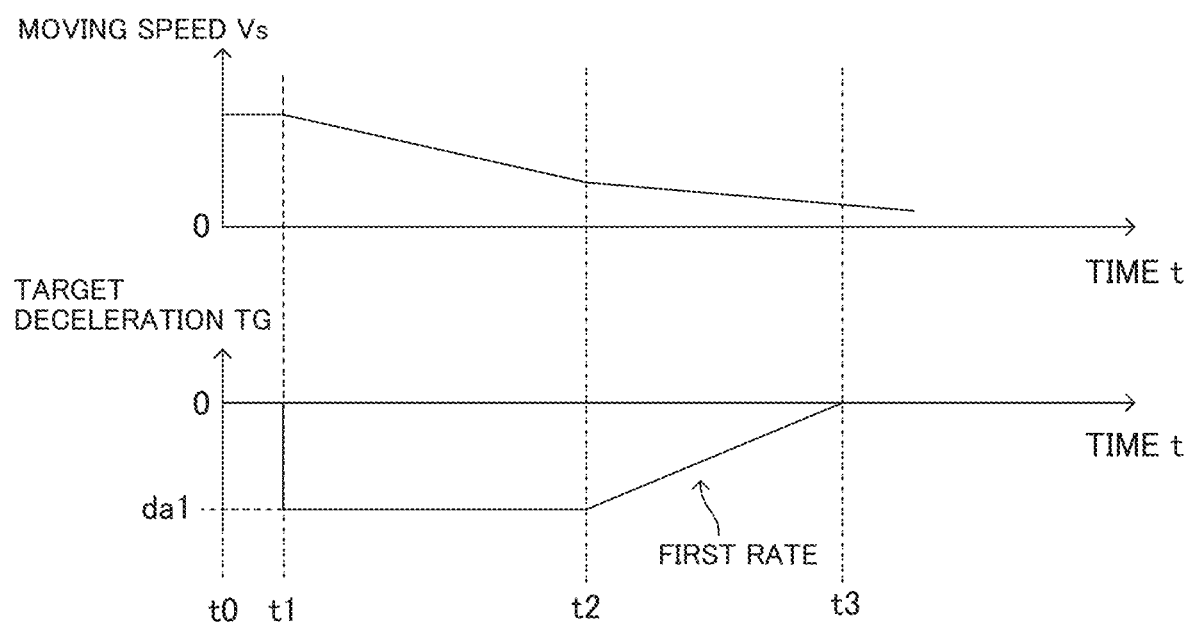
FIG. 6 is a view which shows change of a moving speed Vs of the own vehicle and a target deceleration TG with time t in an operation example 1.

With reference to FIG. 5 and FIG. 6, an operation example 1 of the vehicle control apparatus will be described. In an example shown in FIG. 5, the own vehicle VA moves on the road RD. The road RD is a road which has two lanes in each direction. The road RD includes a first moving lane Ln1 and a second moving lane Ln2. A substantial part of the second moving lane Ln2 is omitted. The moving lane Ln1 is defined by the left lane marking LL and the right lane marking RL. The own vehicle VA moves in the moving lane Ln1.

<Point of Time t0>

At a point of time t0, the center position O of the own vehicle VA is at a position P0 (see FIG. 5). The ECU 10 detects the object (n) in the forward area ahead of the own vehicle VA, based on the object information. The ECU 10 determines that the own vehicle VA is going to collide with the object (n) and determines or sets the object (n) as the obstacle.

<Point of Time t1>

At a point of time t1, the center position O of the own vehicle VA reaches a position P1 (see FIG. 5). At this point of time, the collision predicted time TTC becomes shorter than or equal to the predetermined time threshold Tath. Thus, the predetermined execution condition becomes satisfied. Thus, the ECU 10 starts executing the collision avoiding control. The ECU 10 calculates the target route TP and starts executing the steering control. In addition, the ECU 10 starts executing the braking force control. In this case, the ECU 10 sets the control state to the first state 401 and executes the first decelerating control. As shown in FIG. 6, the ECU 10 sets the target deceleration TG to the deceleration da1 which is a negative acceleration. Then, the ECU 10 decelerates the own vehicle VA. Thus, after the point of time t1, the moving speed Vs of the own vehicle VA is gradually decreased.

<Point of Time t2>

At a point of time t2, the center position O of the own vehicle VA reaches a position P2 (see FIG. 5). At this point of time, the predetermined steering termination condition becomes satisfied. Thus, the ECU 10 terminates executing the steering control. After the ECU 10 terminates executing the steering control, the ECU 10 continues executing the braking force control as described below. In particular, as shown in FIG. 4, the ECU 10 changes the control state from the first state 401 to the second state 402. Thus, the ECU 10 executes the second decelerating control in place of the first decelerating control. That is, the ECU 10 changes the braking force control from the first decelerating control to the second decelerating control. After the point of time t2, the ECU 10 calculates the target deceleration TG in accordance with an expression (1) described below each time a time dT elapses.

$$TG=TG+\Delta G1 \tag{1}$$

Thus, after the point of time t2, the magnitude of the target deceleration TG is decreased at the first rate.

<Point of Time t3>

At a point of time t3, the center position O of the own vehicle VA reaches a position P3 (see FIG. 5). As shown in FIG. 6, at this point of time, the moving speed Vs is not zero. On the other hand, the target deceleration TG is zero. Thus, the predetermined braking termination condition becomes satisfied. Thus, the ECU 10 terminates executing the braking force control. In this example, the ECU 10 terminates executing the second decelerating control.

Thereby, when the predetermined steering termination condition becomes satisfied, the ECU 10 terminates executing the steering control and decreases the magnitude of the target deceleration TG at the first rate to terminate execution of the braking force control. Thus, after the execution of the steering control is terminated, the magnitude of the target deceleration TG does not shortly become zero but is gradually decreased. Thus, the driver is unlikely to have a feeling of strangeness.

Operation Example 2

Figure 7:
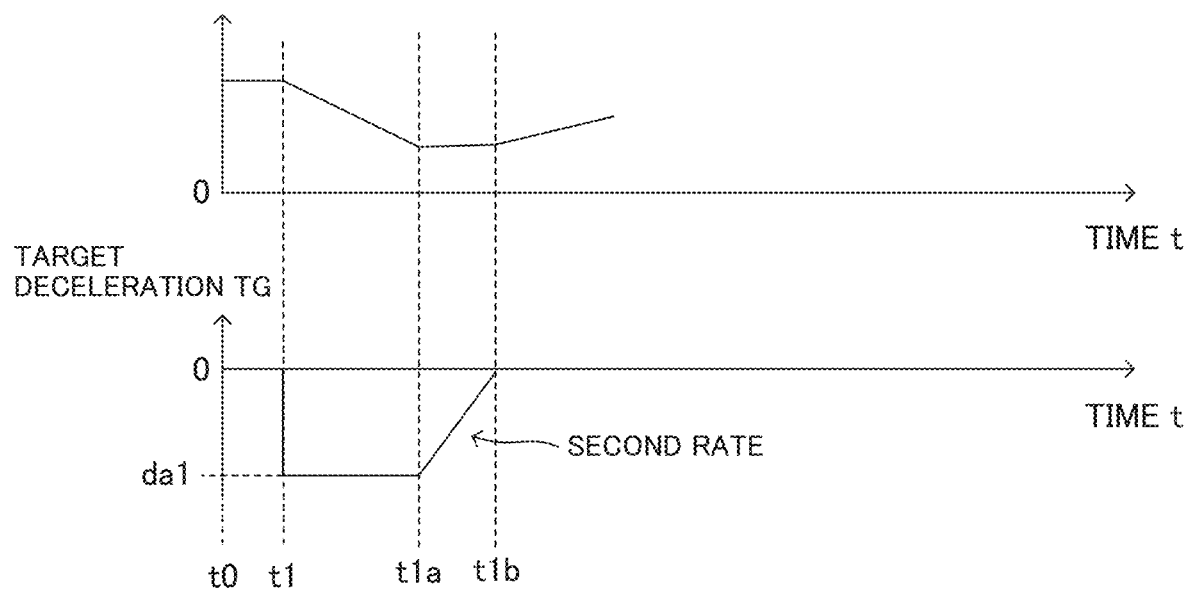
FIG. 7 is a view which shows the change of the moving speed Vs of the own vehicle and the target deceleration TG with time t in an operation example 2.

With reference to FIG. 5 and FIG. 7, an operation example 2 of the vehicle control apparatus will be described. The operation example 2 corresponds to the situation (a) described above. It should be noted that processes of the operation example 2 executed until the point of time t1 are the same as the processes of the operation example 1. Thus, description of the processes of the operation example 2 executed until the point of time t1 will be omitted. Processes of the operation example 2 executed after the point of time t1 will be described.

<Point of Time t1a>

At a point of time t1a, the center position O of the own vehicle VA reaches a position P1a (see FIG. 5). At this point of time, the driver tries to move the own vehicle VA from the first moving lane Ln1 to the second moving lane Ln2 for avoiding the collision of the own vehicle VA with the object (n). That is, the driver carries out the driving maneuver for moving the own vehicle VA in a direction shown by an arrow Ar1. In particular, the driver presses the accelerator pedal 11a with holding the steering wheel SW. Thereby, the accelerator pedal operation amount AP becomes greater than or equal to the predetermined operation amount threshold APth, and the magnitude of the steering torque Tra becomes greater than or equal to the predetermined torque threshold Trth. Thus, the predetermined cancelation condition becomes satisfied. Thus, the ECU 10 terminates executing the steering control. On the other hand, after the ECU 10 terminates executing the steering control, the ECU 10 continues executing the braking force control as described below. In particular, as shown in FIG. 4, the ECU 10 changes the control state from the first state 401 to the third state 403. Thus, the ECU 10 executes the third decelerating control in place of the first decelerating control. That is, the ECU 10 changes the braking force control from the first decelerating control to the third decelerating control. The ECU 10 calculates the target deceleration TG in accordance with an expression (2) described below each time the time dT elapses.

$$TG=TG+\Delta G2 \tag{2}$$

Thus, as shown in FIG. 7, after the point of time t1a, the magnitude of the target deceleration TG is decreased at the second rate.

<Point of Time t1b>

At a point of time t1b, the center position O of the own vehicle VA reaches a position P1b (see FIG. 5). As shown in FIG. 7, at this point of time, the target deceleration TG is zero. Thus, the predetermined braking termination condition becomes satisfied. Thus, the ECU 10 terminates executing the braking force control. In this example, the ECU 10 terminates executing the third decelerating control. Thus, after the point of time t1b, the driving maneuver carried out by the driver is reflected on the own vehicle VA, and the own vehicle VA is accelerated.

Thereby, when the predetermined cancelation condition becomes satisfied, the ECU 10 terminates executing the steering control and decreases the magnitude of the target deceleration TG at the second rate to terminate the execution of the braking force control. Thus, when the driver carries out the driving maneuver, the magnitude of the target deceleration TG relatively shortly becomes zero. That is, the execution of the braking control is shortly terminated. Thereby, the driving maneuver carried out by the driver is reflected on the own vehicle VA. Thus, the driver is unlikely to have a feeling of strangeness.

Operation Example 3

Figure 8:
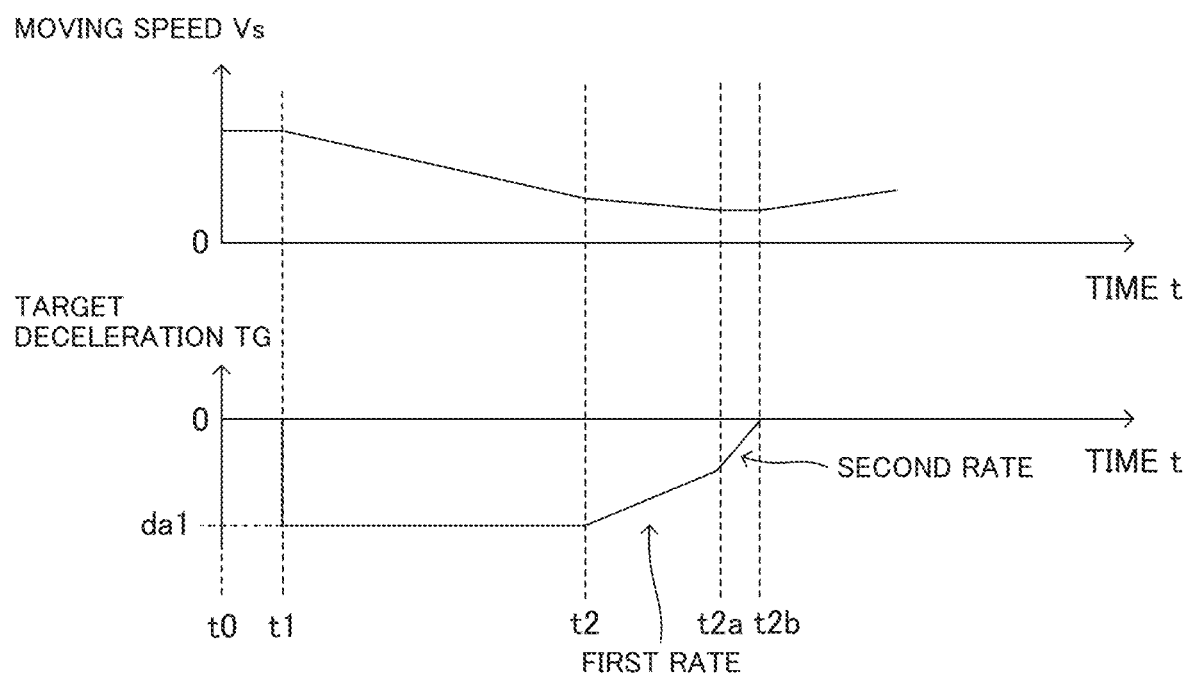
FIG. 8 is a view which shows the change of the moving speed Vs of the own vehicle and the target deceleration TG with time t in an operation example 3.

With reference to FIG. 5 and FIG. 8, an operation example 3 of the vehicle control apparatus will be described. The operation example 3 corresponds to the situation (b) described above. Processes of the operation example 3 executed until the point of time t2 are the same as the processes of the operation example 1. Thus, description of the processes of the operation example 3 executed until the point of time t2 will be omitted. Processes of the operation example 3 executed after the point of time t2 will be described.

<Point of Time t2a>

At a point of time t2a, the center position O of the own vehicle VA reaches a position P2a (see FIG. 5). At this point of time, the driver presses the accelerator pedal 11a. Thereby, the accelerator pedal operation amount AP becomes greater than or equal to the predetermined operation amount threshold APth. Thus, the predetermined cancelation condition becomes satisfied. Thus, as shown in FIG. 4, the ECU 10 changes the control state from the second state 402 to the third state 403. Thus, the ECU 10 executes the third decelerating control in place of the second decelerating control. That is, the ECU 10 changes the braking force control from the second decelerating control to the third decelerating control. After the point of time t2a, the ECU 10 calculates the target deceleration TG in accordance with the expression (2) each time the time dT elapses.

Thus, as shown in FIG. 8, after the point of time t2a, the magnitude of the target deceleration TG is decreased at the second rate.

<Point of Time t2b>

At a point of time t2b, the center position O of the own vehicle VA reaches a position P2b (see FIG. 5). As shown in FIG. 8, at this point of time, the target deceleration TG is zero. Thus, the predetermined braking termination condition becomes satisfied. Thus, the ECU 10 terminates executing the braking force control. In this example, the ECU 10 terminates executing the third decelerating control. Thus, after the point of time t2b, the driving maneuver (i.t., operating the accelerator pedal 11a) carried out by the driver is reflected on the own vehicle VA, and the own vehicle VA is accelerated.

Thereby, when the predetermined cancelation condition becomes satisfied after the predetermined steering termination condition becomes satisfied, the ECU 10 decreases the magnitude of the target deceleration TG at the second rate to terminate the execution of the braking force control. Thus, when the driver carries out the driving maneuver after the execution of the steering control is terminated, the execution of the braking control is terminated shortly, compared with the operation example 1. Thereby, the driving maneuver carried out by the driver is reflected on the own vehicle VA. Thus, the driver is unlikely to have a feeling of strangeness.

<Operations>

The CPU 101 (hereinafter, the CPU 101 will be simply referred to as "CPU") of the ECU 10 is configured or programmed to execute routines shown in FIG. 9 to FIG. 11 each time the time dT elapses.

In addition, the CPU acquires the moving state information from the sensors 11 to 16 and the vehicle surrounding information from the surrounding sensors 17 and memorizes the acquired information in the RAM 103.

It should be noted that the CPU sets values of various flags (i.e., flags XA1, XA2, XB1, and XB2 described later) to "0", respectively in an initializing routine which the CPU executes when an ignition switch not shown is changed from an OFF state to an ON state.

Figure 9:
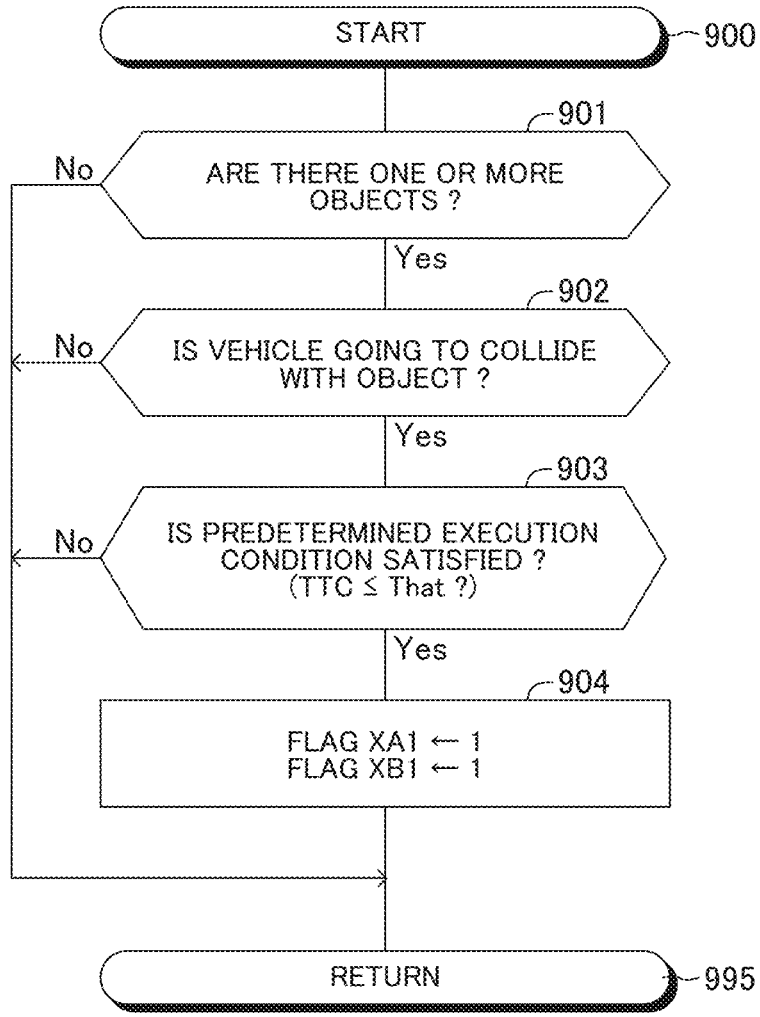
FIG. 9 is a view which shows a flowchart of a first routine executed by a collision avoiding ECU.

At a predetermined timing, the CPU starts a process from a step 900 of the routine shown in FIG. 9 and proceeds with the process to a step 901 to determine whether there are one or more objects in the surrounding area around the own vehicle VA. When there are no objects in the surrounding area around the own vehicle VA, the CPU determines "No" at the step 901 and proceeds with the process directly to a step 995 to terminate executing the process of this routine once.

On the other hand, when the CPU detects at least one object (n), the CPU determines "Yes" at the step 901 and proceeds with the process to a step 902. At the step 902, the CPU determines whether the own vehicle VA is going to collide with the detected object (n). When the own vehicle VA is not going to collide with the object (n), the CPU determines "No" at the step 902 and proceeds with the process directly to the step 995 to terminate executing the process of this routine once.

On the other hand, when the own vehicle VA is going to collide with the object (n), the CPU determines "Yes" at the step 902 and proceeds with the process to a step 903. At the step 903, the CPU determines whether the predetermined execution condition is satisfied. In particular, the CPU determines that the collision predicted time TTC is shorter than or equal to the predetermined time threshold Tath.

When the predetermined execution condition is not satisfied, the CPU determines "No" at the step 903 and proceeds with the process directly to the step 995 to terminate executing the process of this routine once.

On the other hand, when the predetermined execution condition is satisfied, the CPU determines "Yes" at the step 903 and proceeds with the process to a step 904. At the step 904, the CPU sets a value of a flag XA1 to "1" and a value of a flag XB1 to "1". Then, the CPU proceeds with the process to the step 995 to terminate executing the process of this routine once. When the value of the flag XA1 is "1", the flag XA1 represents that the routine shown in FIG. 10 described later is executed. When the value of the flag XB1 is "1", the flag XB1 represents that the routine shown in FIG. 11 described later is executed.

Figure 10:
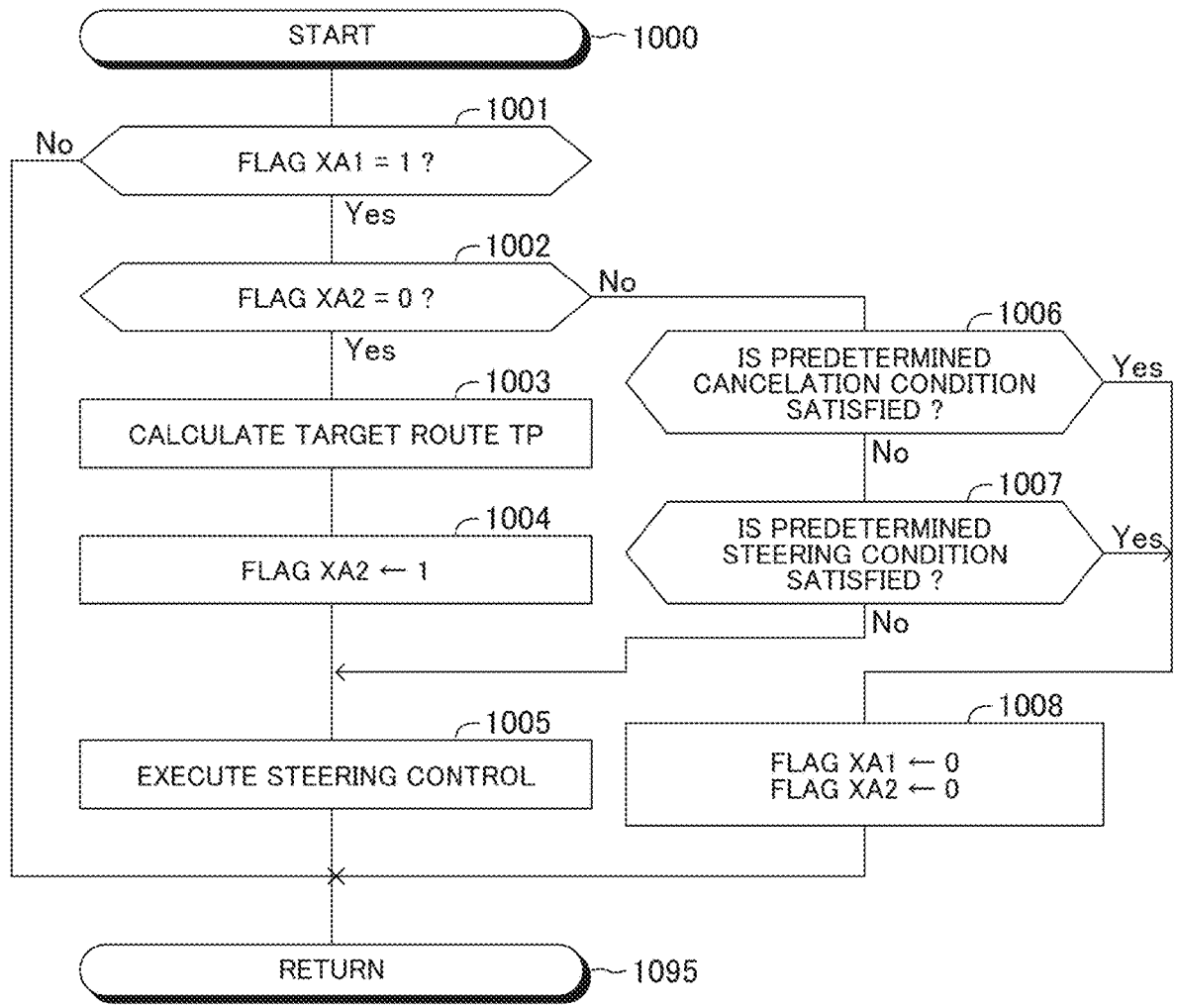
FIG. 10 is a view which shows a flowchart of a second routine executed by the collision avoiding ECU.

Further, at a predetermined timing, the CPU executes the routine shown in FIG. 10. The CPU starts a process from a step 1000 of the routine shown in FIG. 10 and proceeds with the process to a step 1001 to determine whether the value of the flag XA1 is "1". When the value of the flag XA1 is not "1", the CPU determines "No" at the step 1001 and proceeds with the process directly to a step 1095 to terminate executing the process of this routine once.

When the value of the flag XA1 has been set to "1" at the step 904 of the routine shown in FIG. 9, the CPU determines "Yes" at the step 1001 and proceeds with the process to a step 1002 to determine whether the value of the flag XA2 is "0". When the value of the flag XA2 is "0", the flag XA2 represents that the steering control is not executed. On the other hand, when the value of the flag XA2 is "1", the flag XA2 represents that the steering control is being executed.

When the value of the flag XA2 is "0", the CPU determines "Yes" at the step 1002 and sequentially executes processes of steps 1003 to 1005 described below. Then, the CPU proceeds with the process to the step 1095 to terminate executing the process of this routine once.

Step 1003: The CPU calculates the target route TP as described above.

Step 1004: The CPU sets the value of the flag XA2 to "1".

Step 1005: The CPU executes the steering control, based on the target route TP. The CPU calculates the target steering torque Atr, based on the target route TP and sends the steering command signal including the calculated target steering torque Atr to the steering ECU 40. The steering ECU 40 drives the assist motor 41, based on the target steering torque Atr.

Thereafter, when the CPU starts the process of the routine shown in FIG. 10 from the step 1000 and proceeds with the process to the step 1002, the CPU determines "No" and proceeds with the process to a step 1006. At the step 1006, the CPU determines whether the predetermined cancelation condition is satisfied. When the predetermined cancelation condition is not satisfied, the CPU determines "No" at the step 1006 and proceeds with the process to a step 1007 to determine whether the predetermined steering termination condition is satisfied. When the predetermined steering termination condition is not satisfied, the CPU determines "No" at the step 1007 and proceeds with the process to the step 1005 to execute the steering control. As such, when the predetermined cancelation condition and the predetermined steering termination condition are not satisfied, the CPU continues executing the steering control.

When the predetermined cancelation condition becomes satisfied while the CPU repeatedly executes the routine shown in FIG. 10, the CPU determines "Yes" at the step 1006 and proceeds with the process to a step 1008.

In addition, when the predetermined steering termination condition becomes satisfied while the CPU repeatedly executes the routine shown in FIG. 10, the CPU determines "Yes" at the step 1007 and proceeds with the process to the step 1008.

At the step 1008, the CPU sets the value of the flag XA1 to "0" and the value of the flag XA2 to "0". Thereby, the CPU determines "No" at the step 1001. Thus, the execution of the steering control is terminated.

Figure 11:
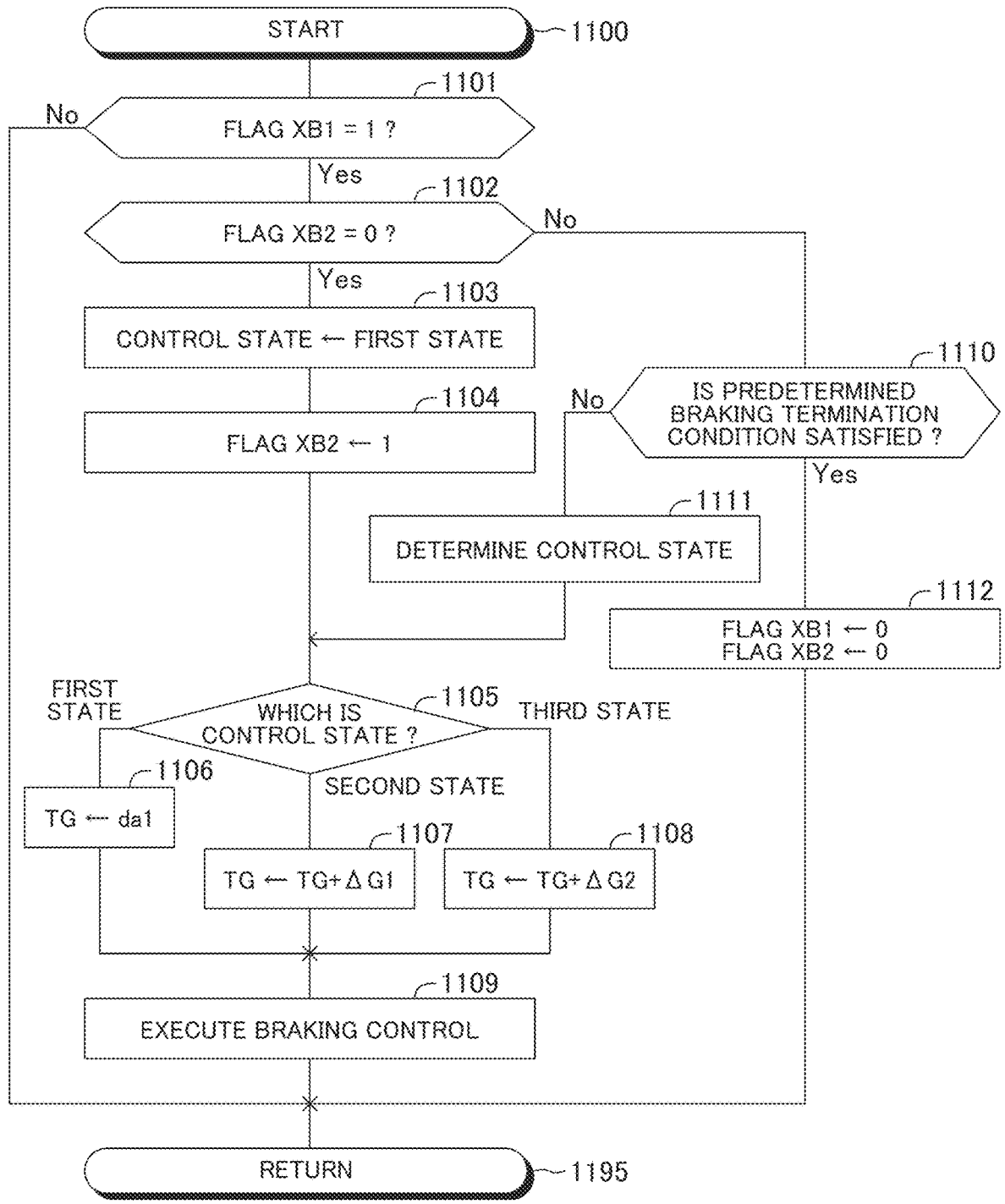
FIG. 11 is a view which shows a flowchart of a third routine executed by the collision avoiding ECU.

Further, at a predetermined timing, the CPU executes the routine shown in FIG. 11. The CPU starts a process from a step 1100 and proceeds with the process to a step 1101 to determine whether the value of the flag XB1 is "1". When the value of the flag XB1 is not "1", the CPU determines "No" at the step 1110 and proceeds with the process directly to a step 1195 to terminate executing the process of this routine once.

When the value of the flag XB1 has been set to "1" at the step 904 of the routine shown in FIG. 9, the CPU determines "Yes" at the step 1101 and proceeds with the process to a step 1102 to determine whether a value of a flag XB2 is "0". When the value of the flag XB2 is "0", the flag XB2 represents that the braking force control is not executed. On the other hand, when the value of the flag XB2 is "1", the flag XB2 represents that the braking force control is being executed.

When the value of the flag XB2 is "0", the CPU determines "Yes" at the step 1102 and sequentially executes processes of steps 1103 and 1104 described below. Then, the CPU proceeds with the process to a step 1105.

Step 1103: The CPU sets the control state to the first state 401 since the CPU will start executing the braking force control.

Step 1104: The CPU sets the value of the flag XB2 to "1".

At the step 1105, the CPU determines which the current control state is, the first state 401, the second state 402, or the third state 403.

When the control state is the first state 401, the CPU sequentially executes processes of steps 1106 and 1109 described below. That is, the CPU executes the first decelerating control. Then, the CPU proceeds with the process to the step 1195 to terminate executing the process of this routine once.

Step 1106: The CPU sets the target deceleration TG to the deceleration da1.

Step 1109: The CPU sends the braking command signal including the target deceleration TG to the brake ECU 30. The brake ECU 30 controls the brake actuators 31, based on the target deceleration TG.

Thereafter, when the CPU starts the process of the routine shown in FIG. 11 from the step 1100 and proceeds with the process to the step 1102, the CPU determines "No" and proceeds with the process to a step 1110. At the step 1110, the CPU determines whether the predetermined braking termination condition is satisfied.

When the predetermined braking termination condition is not satisfied, the CPU determines "No" at the step 1110 and proceeds with the process to a step 1111. At the step 1111, the CPU determines the current control state. In particular, the CPU determines whether the predetermined steering termination condition or the predetermined cancelation condition is satisfied and changes the control state as shown in FIG. 4. When the predetermined steering termination condition is satisfied, the CPU changes the control state to the second state 402. Then, the CPU proceeds with the process to the step 1105. When the control state is the second state 402, the CPU sequentially executes a process of a step 1107 and the process of the step 1109 as described below. That is, the CPU executes the second decelerating control. Then, the CPU proceeds with the process to the step 1195 to terminate executing the process of this routine once.

Step 1107: The CPU calculates the target deceleration TG in accordance with the expression (1).

Step 1109: The CPU sends the braking command signal including the target deceleration TG to the brake ECU 30. The brake ECU 30 controls the brake actuators 31, based on the target deceleration TG.

On the other hand, when the predetermined cancelation condition is satisfied, the CPU changes the control state to the third state 403 at the step 1111. Then, the CPU proceeds with the process to the step 1105. When the control state is the third state 403, the CPU sequentially executes a process of a step 1108 and the process of the step 1109 described below. That is, the CPU executes the third decelerating control. Then, the CPU proceeds with the process to the step 1195 to terminate executing the process of this routine once.

Step 1108: The CPU calculates the target deceleration TG in accordance with the expression (2).

Step 1109: The CPU sends the braking command signal including the target deceleration TG to the brake ECU 30. The brake ECU 30 controls the brake actuators 31, based on the target deceleration TG.

When the predetermined braking termination condition becomes satisfied while the CPU repeatedly executes the routine shown in FIG. 11, the CPU determines "Yes" at the step 1110 and proceeds with the process to a step 1112. At the step 1112, the CPU sets the value of the flag XB1 to "0" and the value of the flag XB2 to "0". Thereby, the CPU determines "No" at the step 1101. Thus, the execution of the braking force control is terminated.

The vehicle control apparatus configured as described above, can change the termination processes to terminate the execution of the braking force control, depending on the situations. When the predetermined steering termination condition becomes satisfied, the vehicle control apparatus decreases the target deceleration TG at the first rate to terminate the execution of the braking force control. On the other hand, when the predetermined cancelation condition becomes satisfied, the vehicle control apparatus decreases the target deceleration TG at the second rate to terminate the execution of the braking force control. As described above, the second rate is greater than the first rate. Thereby, when the predetermined steering termination condition becomes satisfied, the magnitude of the target deceleration TG is gradually, not shortly decreased. Thus, the driver is unlikely to have a feeling of strangeness. Further, when the predetermined cancelation condition becomes satisfied, that is, when the driver carries out the driving maneuver, the magnitude of the target deceleration TG becomes zero in shorter time than when the predetermined steering termination condition becomes satisfied. The driving maneuver carried out by the driver is reflected on the own vehicle VA. Thus, the driver is unlikely to have a feeling of strangeness.

Furthermore, also when the predetermined cancelation condition becomes satisfied after the predetermined steering termination condition becomes satisfied, the vehicle control apparatus decreases the target deceleration TG at the second rate to terminate the execution of the braking force control. When the driver carries out the driving maneuver after the execution of the steering control is terminated, the execution of the braking force control is shortly terminated. Thus, the driving maneuver carried out by the driver is reflected on the own vehicle VA. Thus, the driver is unlikely to have a feeling of strangeness.

It should be noted that the invention is not limited to the aforementioned embodiments, and various modifications can be employed within the scope of the invention.

Modified Example 1

The predetermined execution condition is not limited to one described above. The predetermined execution condition may be other conditions. For example, the predetermined execution condition may additionally include a condition which relates to a moving distance Lx until the own vehicle VA stops.

In particular, the ECU 10 may be configured to calculate the moving distance Lx assuming that the own vehicle VA is decelerated at the deceleration da1. The moving distance Lx is also referred to as "braking distance". The moving distance Lx can be calculated by one of known techniques. For example, the ECU 10 may calculate the moving distance Lx, based on the current moving speed Vs and the deceleration da1.

The ECU 10 may be configured to determine whether an expression (3) described below is satisfied. As shown in FIG. 3, the longitudinal distance Dfx(n) is a longitudinal distance to the obstacle or the object (n). β is a predetermined distance.

$$Lx > (Dfx(n) - \beta) \quad (3)$$

When the expression (3) is satisfied, it means the own vehicle VA cannot stop a position away from the object (n) by the distance β (see FIG. 3). Thus, probability that the own vehicle VA collides with the object (n), is high. Thus, the ECU 10 may be configured to determine that the predetermined execution condition is satisfied when the condition relating to the moving distance Lx and the condition relating to the collision predicted time TTC are satisfied.

Modified Example 2

The collision avoiding control may include an alerting control of alerting the driver. In particular, when the predetermined execution condition becomes satisfied, the ECU 10 may send an alerting command signal to the meter ECU 50. When the meter ECU 50 receives the alerting command signal from the ECU 10, the meter ECU 50 displays an alerting mark on the display 51 and outputs an alerting sound from the speaker 52.

Modified Example 3

The predetermined steering termination condition is not limited to one described above. The predetermined steering termination condition may be other conditions as far as the predetermined steering termination condition is a condition which allows to determine a fact that the own vehicle VA has avoided the collision with the object (n). Also, the predetermined cancelation condition is not limited to one described above. The predetermined cancelation condition may be other conditions as far as the predetermined cancelation condition is a condition which allows to determine the driving maneuver carried out by the driver.

Modified Example 4

The CPU may be configured to calculate a target steering angle θt which is a target value of the steering angle θ of the own vehicle VA. In this case, the CPU sends the steering command signal including the target steering angle θt to the steering ECU 40. In this case, the steering ECU 40 drives the assist motor 41, based on the target steering angle θt.

What is claimed is:

1. A vehicle control apparatus, comprising:
   at least one sensor which is configured to acquire object information on objects in a surrounding area around an own vehicle; and
   an electronic control unit which is configured to execute a collision avoiding control of avoiding collision of the own vehicle with the object when the electronic control unit determines, based on the object information, that a predetermined execution condition that the own vehicle is going to collide with the object, becomes satisfied,
   the collision avoiding control including:
     a steering control of changing a steering angle of the own vehicle to move the own vehicle along a target route set to avoid collision of the own vehicle with the object; and
     a braking force control of applying braking force to the own vehicle so as to realize a target deceleration,
   the electronic control unit is configured to:
     terminate executing the steering control and decrease the target deceleration at a first rate to terminate execution of the braking force control when a predetermined steering termination condition that the collision of the own vehicle with the object has been avoided by the steering control, becomes satisfied; and
     terminate executing the steering control and decrease the target deceleration at a second rate to terminate the execution of the braking force control when a predetermined cancelation condition that a driver of the own vehicle carries out a driving maneuver, becomes satisfied, and
   the second rate is greater than the first rate.

2. The vehicle control apparatus as set forth in claim 1, wherein the electronic control unit is configured to decrease the target deceleration at the second rate to terminate the execution of the braking force control when the predetermined cancelation condition becomes satisfied after the predetermined steering termination condition becomes satisfied.

3. The vehicle control apparatus as set forth in claim 1, wherein the electronic control unit is configured to determine that the predetermined steering termination condition becomes satisfied when (i) the own vehicle has passed by the object, and (ii) the steering angle continues to be smaller than or equal to a predetermined steering angle value for a predetermined duration time threshold or more.

4. The vehicle control apparatus as set forth in claim 3, wherein the electronic control unit is configured to determine that the predetermined cancelation condition becomes satisfied when (i) a first condition that an operation amount of an accelerator pedal of the own vehicle is greater than or equal to a predetermined operation amount threshold, becomes satisfied, or (ii) a second condition that steering torque applied to a steering shaft of the own vehicle by maneuvering a steering wheel of the own vehicle by the driver is greater than or equal to a predetermined torque threshold, becomes satisfied and,
   wherein the electronic control unit is configured to decrease the target deceleration at the second rate to terminate the execution of the braking force control when the predetermined cancelation condition becomes satisfied after the predetermined steering termination condition becomes satisfied.

5. The vehicle control apparatus as set forth in claim 1, wherein the electronic control unit is configured to determine that the predetermined cancelation condition becomes satisfied when (i) a first condition that an operation amount of an accelerator pedal of the own vehicle is greater than or equal to a predetermined operation amount threshold, becomes satisfied, or (ii) a second condition that steering torque applied to a steering shaft of the own vehicle by maneuvering a steering wheel of the own vehicle by the driver is greater than or equal to a predetermined torque threshold, becomes satisfied.

* * * * *